(12) United States Patent
Serizawa et al.

(10) Patent No.: US 10,045,375 B2
(45) Date of Patent: Aug. 7, 2018

(54) MULTI-HOP RADIO COMMUNICATION METHOD

(71) Applicant: Hitachi, Ltd., Tokyo (JP)

(72) Inventors: Yasutaka Serizawa, Tokyo (JP);
Masayuki Miyazaki, Tokyo (JP);
Kenichiro Yamane, Tokyo (JP);
Tatsuki Inuduka, Tokyo (JP); Ryo Nakano, Tokyo (JP); Satoru Harada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 15/111,917

(22) PCT Filed: Feb. 5, 2014

(86) PCT No.: PCT/JP2014/052606
§ 371 (c)(1),
(2) Date: Jul. 15, 2016

(87) PCT Pub. No.: WO2015/118622
PCT Pub. Date: Aug. 13, 2015

(65) Prior Publication Data
US 2016/0338099 A1 Nov. 17, 2016

(51) Int. Cl.
*H04W 74/04* (2009.01)
*H04W 4/06* (2009.01)
*H04W 84/18* (2009.01)
*H04W 88/08* (2009.01)

(52) U.S. Cl.
CPC ............. *H04W 74/04* (2013.01); *H04W 4/06* (2013.01); *H04W 84/18* (2013.01); *H04W 88/08* (2013.01)

(58) Field of Classification Search
CPC ....... H04W 74/04; H04W 84/18; H04W 4/06; H04W 88/08
See application file for complete search history.

(56) References Cited

U.S. PATENT DOCUMENTS

| 2002/0024935 A1* | 2/2002 | Furukawa ............ H04B 7/155 370/238 |
| 2005/0180399 A1 | 8/2005 | Park et al. |
| 2007/0001869 A1 | 1/2007 | Hunzinger |

(Continued)

FOREIGN PATENT DOCUMENTS

| JP | 02-117238 A | 5/1990 |
| JP | 2007-013960 A | 1/2007 |

(Continued)

OTHER PUBLICATIONS

International Search Report of PCT/JP2014/052606 dated Apr. 28, 2014.

*Primary Examiner* — Jianye Wu
(74) *Attorney, Agent, or Firm* — Mattingly & Malur, PC

(57) ABSTRACT

In a multi-hop radio communication network including a base station (a radio station connected to a management server), each radio station in the network is given a data transmission opportunity in turn according to a predetermined transmission order, and transmits data via broadcast or multicast upon occurrence of transmission timing. The radio station having received the data adds data of the radio station to the received data and then forwards the packet via broadcast or multicast when it is the radio station's turn for transmission.

10 Claims, 22 Drawing Sheets

(56) References Cited

U.S. PATENT DOCUMENTS

| | | | |
|---|---|---|---|
| 2010/0183153 A1* | 7/2010 | Cho | H04L 45/122 380/277 |
| 2012/0195252 A1* | 8/2012 | Suga | H04B 7/15528 370/315 |
| 2012/0224472 A1* | 9/2012 | Kim | H04W 24/04 370/226 |
| 2012/0239718 A1 | 9/2012 | Takahashi et al. | |
| 2016/0338099 A1* | 11/2016 | Serizawa | H04W 74/04 |

FOREIGN PATENT DOCUMENTS

| | | |
|---|---|---|
| JP | 2007-295583 A | 11/2007 |
| JP | 2007-335943 A | 12/2007 |
| JP | 2012-195786 A | 10/2012 |
| WO | 2012/101779 A1 | 8/2012 |

\* cited by examiner

FIG. 3

| RADIO STATION | 1 | 10 | 11 | 12 | 13 |
|---|---|---|---|---|---|
| TRANSMISSION ORDER | 5 | 4, 6 | 3, 7 | 2, 8 | 1, 9 |

FIG. 5

| PACKET CLASSIFICATION | TRANSMITTING SOURCE (SERIAL NUMBER IN FIG. 4) | DATA CONTENT | | | | | DATA REDUNDANCY |
|---|---|---|---|---|---|---|---|
| | | 1 | 10 | 11 | 12 | 13 | |
| | 1 | - | | | | - | |
| DATA (UPLINK) | 10 (410d) | | O | O | O | O | 4 |
| | 11 (411d) | | | O | O | O | 3 |
| | 12 (412d) | | | | O | O | 2 |
| | 13 (413d) | | | | | O | 1 |
| CONTROL (DOWNLINK) | 1 (401c) | | O | O | O | O | 4 |
| | 10 (410c) | | | O | O | O | 3 |
| | 11 (411c) | | | | O | O | 2 |
| | 12 (412c) | | | | | O | 1 |
| | 13 | - | | | | - | |

FIG. 6

| PACKET CLASSIFICATION | TRANSMITTING SOURCE (SERIAL NUMBER IN FIG. 4) | DATA CONTENT | | | | | DATA REDUNDANCY |
|---|---|---|---|---|---|---|---|
| | | 1 | 10 | 11 | 12 | 13 | |
| | 1 | - | | | | | |
| DATA | 10 (410d) | | ○ | ○ | ○ | ○ | 4 |
| | 11 (411d) | | | ○ | ○ | ○ | 3 |
| | 12 (412d) | | | | ○ | ○ | 2 |
| | 13 (413d) | | | | | ○ | 1 |
| DATA | 1 (401c) | | ○ | ○ | ○ | ○ | 4 |
| | 10 (410c) | | ○ | ○ | ○ | ○ | 4 |
| | 11 (411c) | | ○ | ○ | ○ | ○ | 4 |
| | 12 (412c) | | ○ | ○ | ○ | ○ | 4 |
| | 13 | - | | | | | |

FIG. 17

| RADIO STATION ID | 1 | 10 | 11 | 12 | 13 |
|---|---|---|---|---|---|
| GROUP | - | 1 | 1 | 2 | 2 |

FIG. 20

| RADIO STATION | 1 | 10 | 11 | 12 | 13 |
|---|---|---|---|---|---|
| CARRIER SENSE TIME (UPLINK) | 1 | 2 | 3 | 4 | 5 |
| CARRIER SENSE TIME (DOWNLINK) | 5 | 4 | 3 | 2 | 1 |

MULTI-HOP RADIO COMMUNICATION METHOD

TECHNICAL FIELD

The present invention relates to a multi-hop radio communication method.

BACKGROUND ART

From viewpoints of easiness of installation, low cost, and easiness of operation, demand for radio communication has been increased. In the industrial field, expectation for the radio communication is high that solves problems in cost and cable installation man-hours due to conventional wired LAN connection, and includes mobility and ease in handling as well.

Especially in recent years, not only achieving power related business such as the next-generation power transmission and distribution automation (smart grid), Advanced Metering Infrastructure (AMI), energy management system (xEMS) by the radio communication, but also the multiple radio network integration system has been discussed capable of operating those multiple business applications in one integrated radio network. In IEEE 802.24 TAG (Technical Advisory Group) and the like, application has begun to be discussed for a smart grid of IEEE 802 system communication standard since July 2012. Besides, as a trend of the entire of IEEE 802, standard formulation has been performed by dividing for each communication specification of each application until now; from now on, it is focused on study for more practical use such as mutual use of multiple networks, combination of multiple communications, and network resource effective utilization.

In the power distribution automation field, for voltage fluctuation in a power transmission and distribution network, local control with a power transmission and distribution control device has been conventionally used, such as SVR or SVC installed on a utility pole and the like; however, in the next-generation power transmission and distribution network, it is transitioning to the centralized control type in which a control instruction is distributed to a power transmission and distribution device from a host system such as a server that acquires voltage and current values from sensors installed in various places of the power transmission and distribution network, and optimal control of system voltage is achieved. Further, in more advanced generation, the distributed control type has been studied in which stabilization of an entire system is achieved based on communication by a so-called P2P (Peer to Peer) communication network in which each power transmission and distribution control device independently collects voltage and current information from sensors or communicates control information and the like to another power transmission and distribution control device. On the other hand, conventionally in the AMI field, study has been made mainly for a data collection method from a smart meter under one concentrator, that is, a local AMI network of the centralized control type. However, in study for a method of transmitting data of the smart meter collected in the concentrator to a management server (of a power company and the like), that is, an AMI backbone network, discussion is continuing of common use with a power distribution automation network, communication medium/method, and the like.

CITATION LIST

Patent Literature

PTL 1: JP 2007-13960 A

SUMMARY OF INVENTION

Technical Problem

As described above, a multi-hop radio network system in which a next-generation power distribution automation network and an AMI backbone network are both used or existent requires distributed P2P communications and hence causes an increase in radio traffic as compared with the centralized-control communication network. Besides, AMI backbone network requires transmission of data of smart meters which have been concentrated by a concentrator to a management server, and hence causes an increase in the transmission data amount in the vicinity of a communication network base station, with the result that communication delays are disadvantageously increased. Besides, since data are concentrated in the vicinity of the base station, a data defect in the vicinity of the base station largely influences the entire application, and risk is inevitably increased when viewed from the application.

Solution to Problem

To solve the above problem, in the present invention, in a multi-hop radio communication network including a base station (a radio station connected to a management server), each radio station in the network is given a data transmission opportunity in turn according to a predetermined transmission order, and transmits data via broadcast or multicast upon occurrence of transmission timing. The radio station having received the data adds data of the radio station to the received data and then forwards the packet via broadcast or multicast when it is the radio station's turn for transmission. The transmission order is assigned once for each radio station within one cycle, and the cycle is repeated during operation.

In the present invention, in particular, an environment is assumed in which a situation is assumed in which there is a plurality of other radio stations that can be communicated from one radio station, such as a power transmission and distribution automation network, and the AMI network. Therefore, broadcast or multicast data transmitted from each radio station is received by the plurality of radio stations, so that communication path multiplexing can be achieved.

Advantageous Effects of Invention

According to the present invention, transmission data of each radio station is transmitted to the plurality of radio stations via broadcast or multicast transmission, and the plurality of radio station having received a broadcast or multicast packet forwards the transmission data to which data of the station is added, so that redundancy of data communication and shortening of communication delay time can be achieved and communication reliability is improved.

Besides, due to the fact that each radio station in the network repeats performing broadcast or multicast once in accordance with predetermined transmission order, it becomes possible to achieve a centralized control type radio network required for an AMI application and a distributed type P2P radio network required for a next-generation power distribution network at about the same number of times of communication (number of times of radio wave transmission).

Further, in the AMI application, in particular, it becomes possible to avoid influence due to the data defect in a network backbone part (communication path near the management server) by the path multiplexing.

BRIEF DESCRIPTION OF DRAWINGS

FIG. 3 is a diagram illustrating an example of a communication timing table.

FIG. 5 is a diagram illustrating an example of data content and redundancy in a case of a centralized control type network in the multi-hop radio communication system of the present invention.

FIG. 6 is a diagram illustrating an example of data content and redundancy in a case of a distributed control type P2P network in the multi-hop radio communication system of the present invention.

FIG. 17 is a diagram illustrating an example of a group configuration table.

FIG. 20 is a diagram illustrating an example of a carrier sense time setting table.

DESCRIPTION OF EMBODIMENTS

Hereinafter, examples of the present invention are described with reference to the accompanying drawings.

Further, the examples of the present invention, as described later, can be implemented by software that operates on a general purpose computer, and can be implemented by dedicated hardware or a combination of software and hardware. Incidentally, in the following description, each pieces of information of the present invention is described with a "table" format; however, those pieces of information do not necessarily have to be represented by data structure by the table, and can be represented by data structure such as a list, a DB (Data Base), and others. Therefore, to indicate that it does not depend on the data structure, the "table," "list," "DB" may be simply referred to as "information."

In the following, description may be performed of each processing in embodiments of the present invention by treating a "controller (also can be referred to as processor)" as a subject (operation subject); however, the processor executes predetermined processing (program corresponding to flowchart) while using a memory and a communication port (communication control apparatus), so that the description can be performed by treating each processing (program) as the subject.

Example 1

<Summary of Multi-Hop Radio Communication System>

Figure 1:
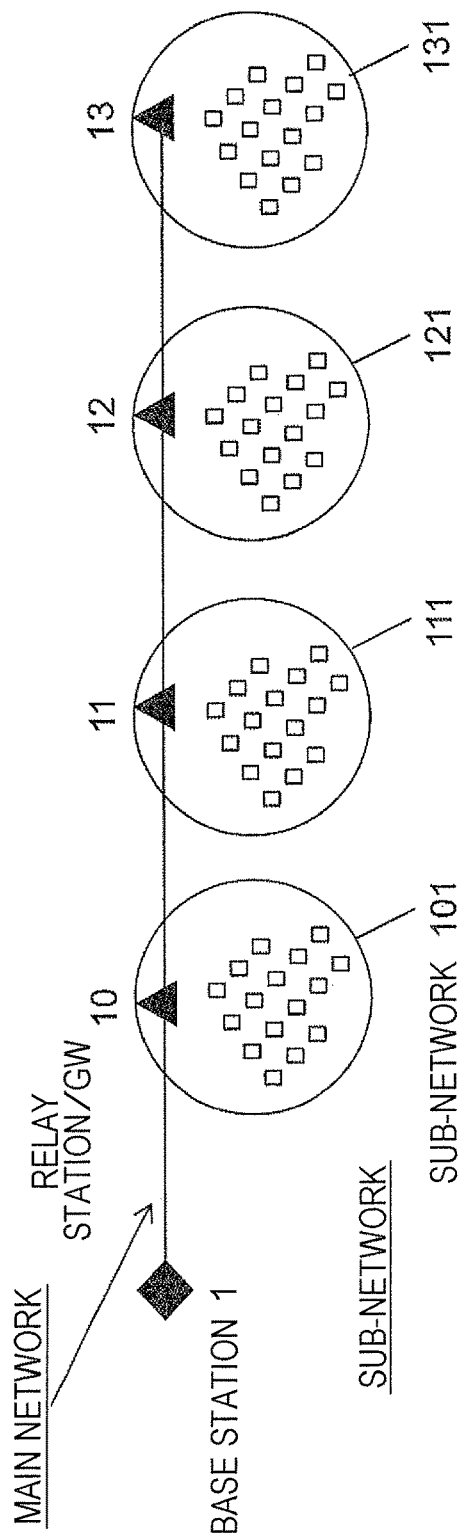
FIG. 1 is a diagram illustrating a schematic configuration example of a multi-hop radio communication system of the present invention.

FIG. 1 is a diagram illustrating a summary of a multi-hop radio communication system according to Example 1.

As illustrated in FIG. 1, the multi-hop radio communication system includes: a base station 1 for collecting data from radio stations (10, 11, 12, 13) in the system and distributing a control instruction to each of the radio stations (10, 11, 12, 13) when needed; a main network having relay stations (10, 11, 12, 13) for transmitting or forwarding data to the base station 1 and each radio station in the network at predetermined transmission timing; relay stations/GWs (10, 11, 12, 13) each having not only a relay station function in a main network but also a GW (Gateway) function viewed from sub-networks (101, 111, 121, 131) under the main network; and a sub-network including a lot of radio terminal stations.

Here, for generalization of the description, the number of relay stations/GWs is four; however, the number of devices configuring the system is not limited. Besides, the number of multi-hops and network topology are also not limited. In the embodiments of the present invention, an example is shown in which the relay stations/GWs (10, 11, 12, 13) autonomously collect data from the sub-networks (101, 111, 121, 131) and transmit data to the base station (center) 1 and another relay station/GW in the main network at the predetermined transmission timing; however, the system can be a multi-hop radio communication system in which the relay stations/GWs (10, 11, 12, 13) receive a data request command of the base station 1 and transmit data into the main network at the predetermined transmission timing.

<Schematic Configuration of Radio Station (Base Station, Relay Station/GW)>

Figure 2:
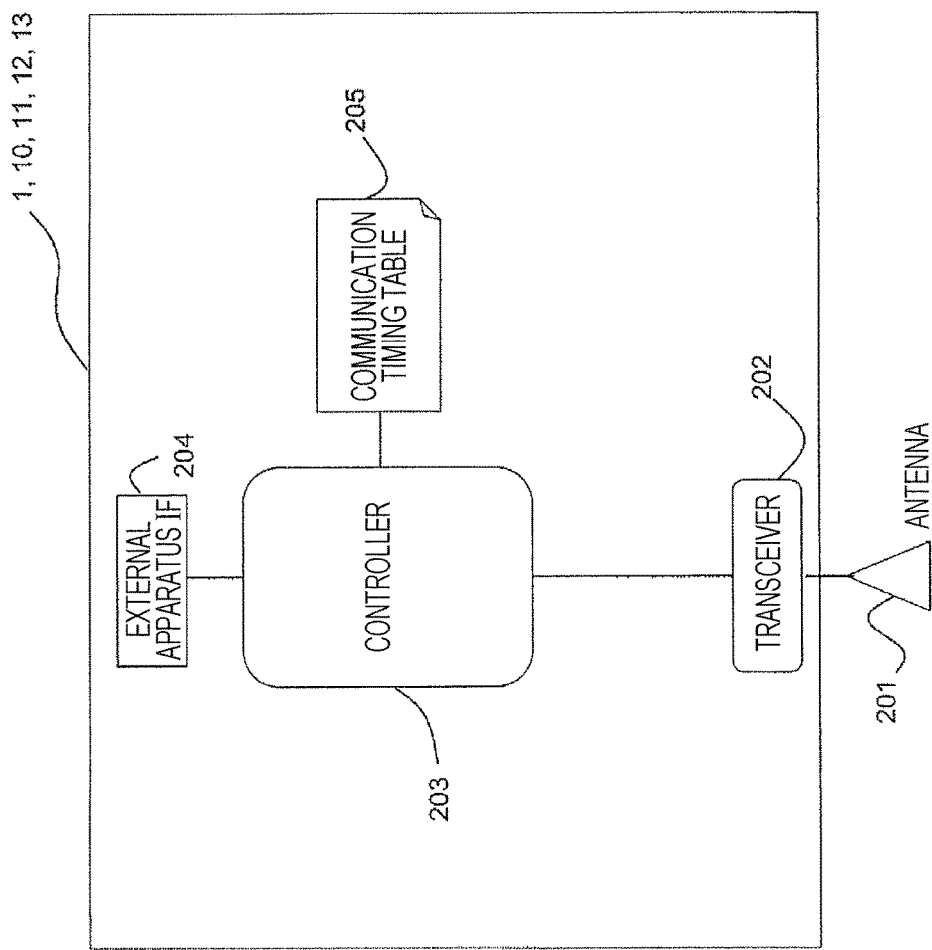
FIG. 2 is a diagram illustrating a schematic configuration example of a base station 1 and relay stations/GWs 10, 11, 12, 13.

FIG. 2 is a diagram illustrating a schematic configuration example of the base station 1, the relay stations/GWs (10, 11, 12, 13). The configuration has: an antenna 201; a transceiver 202; a controller (processor) 203; a communication timing table 205; and an external apparatus interface (IF) 204.

The controller (processor) 203 performs packet transmission and reception management, and, upon occurrence of packet generation timing, when there is data to be transmitted, generates a data packet in which data of the station is added to the data to be transmitted. Then, the controller 203, in accordance with timing (transmission order) described in the communication timing table 205, performs radio broadcast or multicast transmission of data packet prepared via the transceiver 202 and the antenna 201.

Here, the communication timing table 205 is information indicating transmission order of the radio stations in the network as illustrated in FIG. 2. Besides, the communication timing table 205 can be rewritten by the controller 203. Further, the controller 203 is capable of transmitting and receiving data to an external apparatus such as a PC via an external apparatus IF 204, and being rewritten a parameter/set value of itself (controller 203) and communication timing table 205 from the external apparatus.

<Configuration of Communication Timing Table>

FIG. 3 illustrates an example of the communication timing table. In the example of the figure, it is set so that uplink communication (communication from the distal end of the network to the base station direction) is performed in order of the relay station/GW 13, the relay station/GW 12, the relay station/GW 11, the relay station/GW 10, the base station 1, and then downlink communication (communication from the base station 1 to the distal end direction of the network) is performed in order of the base station 1, the relay station/GW 10, the relay station/GW 11, the relay station/GW 12, the relay station/GW 13. All radio stations in the network hold a common communication timing table and broadcast or multicast the packet in the order described in the table.

Besides, the transmission order described in the communication timing table is cyclically repeated. In the example of FIG. 3, when the relay station/GW 13 finishes the ninth transmission, the transmission order returns to 1, and the relay station/GW 13 transmits an uplink communication packet again.

<Message Transmission and Reception Processing>

Figure 4:
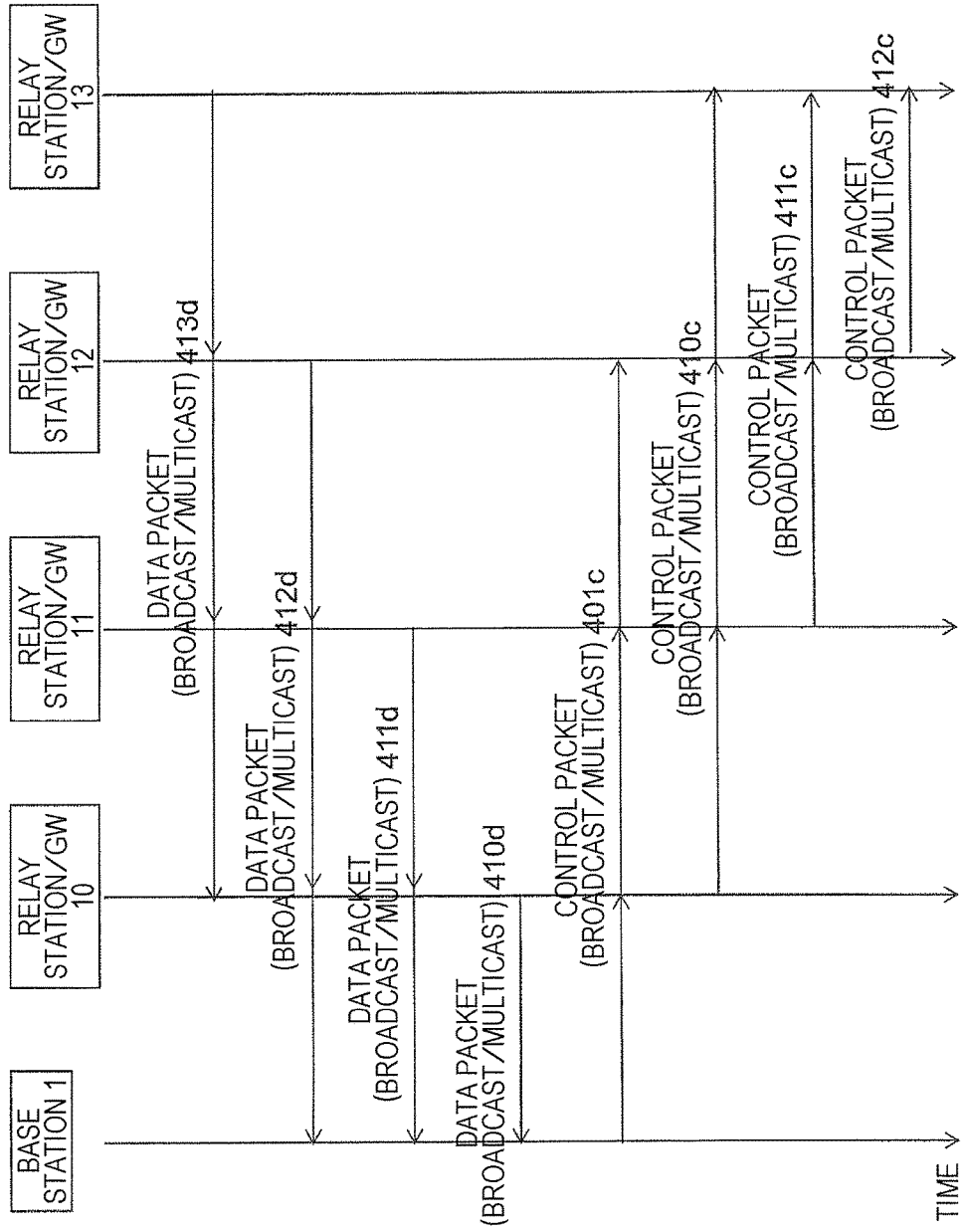
FIG. 4 is a diagram illustrating a data communication flow example in the multi-hop radio communication system of the present invention.

FIG. 4 illustrates a communication flow example in the present invention. Here, an example is illustrated of a case in which broadcast or multicast data can arrive up to the radio station of three hops ahead.

The communication timing (transmission order) is the same as the example described in FIG. 3.

When the relay station/GW 13 broadcasts or multicasts data (413d), the relay station/GW 12 having received the data determines that a received packet is from the relay station/GW 13 from a transmitting source address in the received packet, and recognizes occurrence of transmission opportunity by referring to the communication timing table 205, and prepares a packet in which data of the station is added to the received packet to broadcast or multicast the packet prepared (412d).

The relay station/GW 11, the relay station/GW 10 also forward the packet in the same way (411d, 410d), and the uplink communication is completed by arrival of the data at the base station 1.

In the same way in the downlink communication, a control packet (401c) including a control instruction to the relay stations/GWs (10, 11, 12, 13) is broadcasted or multicasted from the base station 1, and the relay station/GW 10, when receiving the control packet (401c), takes out only the control instruction to the relay station/GW 10 from the control packet (401c) and prepares a control packet (410c) from which only the control instruction to the relay station/GW 10 is taken out, to broadcast or multicast in accordance with the communication timing table 205.

In the same way, the relay stations/GWs 11 and 12 take out only the control instructions of the stations, and transmit the packet to the relay station/GW 13 by preparing a packet taken out and forwarding via broadcast or multicast.

FIG. 5 illustrates in a table contents and data redundancy (number of data of each radio station described in the packet) of data packets (410d, 411d, 412d, 413d) and control packets (401c, 410c, 411c, 412c) of when the communication of the above one cycle (uplink/downlink) is executed.

By broadcast or multicast having data redundancy, it becomes possible to transmit the same data multiple times, and reliability improvement of communication becomes possible.

In particular, in a power distribution automation business that is a part of assumed applications of the present invention, it is concerned that instability of a power distribution system of a network distal end is especially increased by introduction of the mega solar and the like in the future; however, in the present invention, it can be seen that the more distal radio station is given the more times of transmission opportunity.

<P2P (Peer to Peer) Communication>

In the above, for the description, an example has been shown in which the packet type is classified into data (uplink communication), control (downlink communication) in FIG. 4, FIG. 5, and a centralized control type network is mainly assumed; however, in the present invention, it is also possible to apply to P2P communication that aims to share the data held by each radio station with all or part of the radio station without distinguishing the uplink/downlink communication.

At that time, as illustrated in FIG. 6, distributed P2P communication can be achieved by forwarding with the maximum number of the data redundancy as much as possible at time of data forwarding. However, when the data of all radio stations cannot be distributed at once from the base station 1, the data are divided to be transmitted multiple times.

Besides, a sequence number is given to the data of each radio station, and, when the data are held having different sequence numbers of the same radio station data, only the data of the latest sequence number is forwarded. Here, as illustrated in FIG. 5, FIG. 6, it is one of the features of the present invention that an application requiring a centralized control type network and an application requiring a distributed type P2P network can be achieved by the same communication method and at about the same communication amount (number of times of data transmission), and further, reliability improvement of communication is achieved by increasing the data redundancy.

<Data Redundancy and Number of Times of Retransmission Limitation>

As it is also in the above description, the data redundancy indicated in FIG. 5, FIG. 6 is one of important parameters for achieving communication reliability improvement in the present invention. On the other hand, retransmission is generally performed for the communication reliability improvement. Therefore, increasing the data redundancy and increasing the number of times of retransmission directly contribute to the communication reliability improvement of a radio multi-hop network in the present invention.

However, the increase in the data redundancy and the increase in the number of times of retransmission both lead to an increase in data arrival delay time. Therefore, in an application (for example, AMI) in which a data collect period is long and a request for the delay time is relatively relaxed, it is possible to set the maximum number of redundancy equal to or greater than the number of radio stations in the main network.

On the other hand, in an application (for example, power distribution automation) in which a request for the delay time is strict, it is required that the data redundancy is less than the number of radio stations in the main network, and it is required to limit the redundancy.

In the following example, examples are described of a case in which the maximum redundancy of the data can be set equal to or greater than the number of radio stations in the main network and a case in which it is required to limit the data redundancy.

Example 2

In Example 2, the case is described in which the maximum redundancy of the data can be set equal to or greater than the number of radio stations in the main network. In particular, systems of a TDMA (Time Division Multiple Access) method and a CSMA (Carrier Sense Multiple Access) method are described independently.

<TDMA Method>

In a radio system of the TDMA method, transmission and reception by radio is performed in a time unit of a time slot. That is, each radio station periodically executes time synchronization with each other, and achieves radio communication by transitioning to transmission mode and reception mode at a predetermined time slot.

Figure 7:
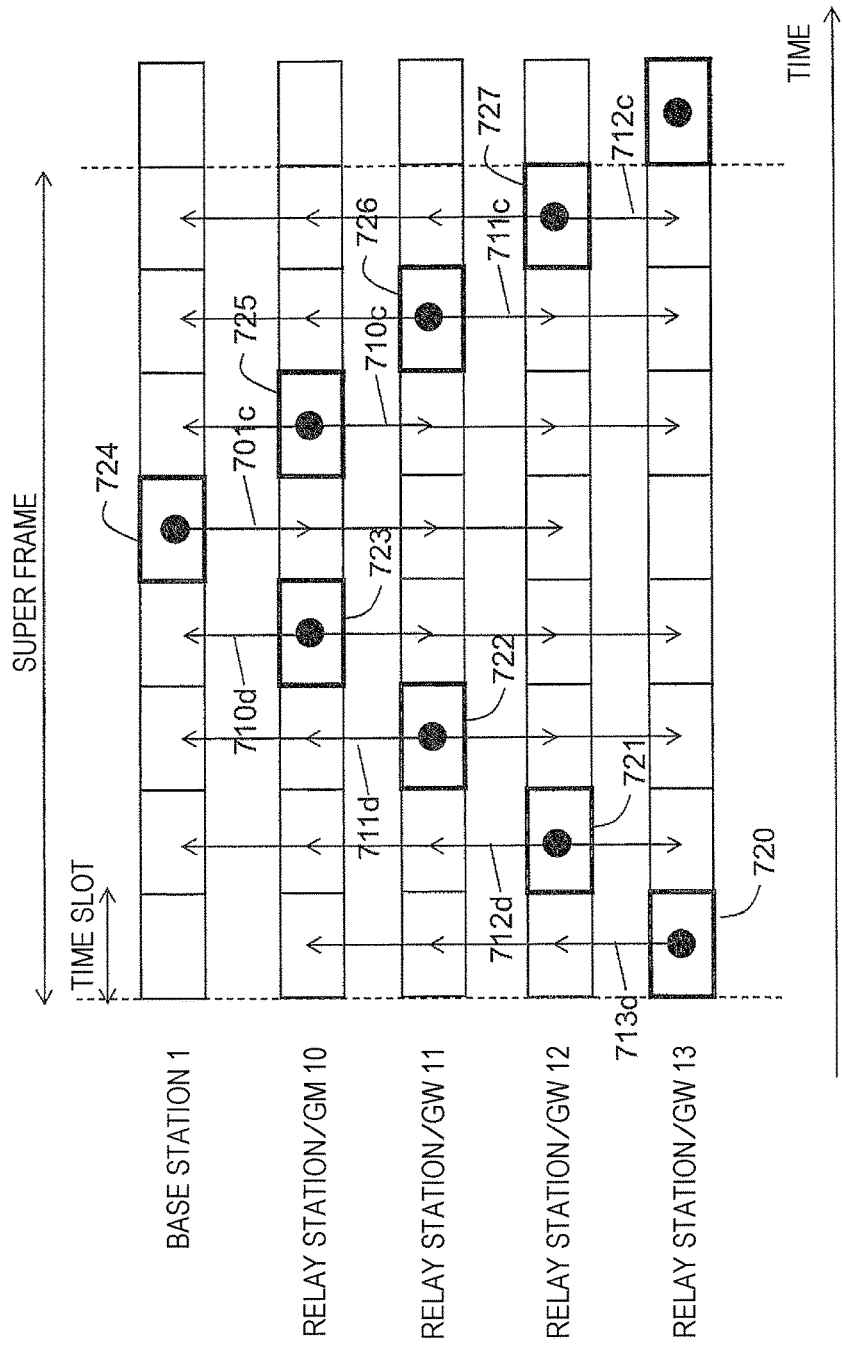
FIG. 7 is a diagram illustrating a time slot configuration example in a case of the multi-hop radio communication system (TDMA) of the present invention.

Besides, a communication cycle is defined that is referred to as a super frame including a plurality of continuous time slots, and periodic communication can be achieved by repeatedly executing the super frame. FIG. 7 illustrates a time slot configuration in the multi-hop radio communication system (including base station 1, relay station/GW 10, relay station/GW 11, relay station/GW 12, and relay station/GW 13) described in Example 1. Each one frame of FIG. 7 is a time slot, and the super frame including the plurality of time slots is illustrated. Time slots 720-727 illustrated by a thick frame indicate transmission opportunity in each radio station. In time slots other than 720-727, each radio station waits in a reception standby state.

In the present example, assignment of the time slot 720-727 is made so that, in uplink communication, the transmission order is assigned in turn from a radio station farther in the number of hops from the base station 1, and, in downlink communication, the transmission order is assigned in turn from the radio station closer from the base station 1. Each radio station, when it is the radio station's opportunity for transmission, forwards data of the station and the data of other radio stations (if held) via broad/multicast.

Thus, as illustrated in FIG. 5 or FIG. 6, communication becomes possible in which the data redundancy is increased, and it is available for both of the centralized control type network/distributed type P2P network. Even if communication is blocked from the relay station/GW 13 to the relay station/GW 12, since the data redundancy is increased by broadcast or multicast, the relay station/GW 10 or the relay station/GW 11 can receive the data of the relay station/GW 13, so that it becomes possible to transmit the data of the relay station/GW 13 to the base station 1 and the relay station/GW 12 via the relay station/GW 10 or 11. The same discussion is possible when the other radio connection is broken.

<CSMA Method>

In a radio system of the CSMA method, each radio station in the multi-hop radio communication system does not execute time synchronization with each other, and executes transmission and reception operation asynchronously. Each radio station, before data packet transmission, executes carrier sense (that transitions to a reception standby state temporarily, and suspends data packet transmission scheduled immediately after the transition when receiving a radio wave from the other radio station, and executes data packet transmission only when not receiving the radio wave from the other radio station), and transmits the data packet only when succeeding in the carrier sense.

For length of time for executing the carrier sense, random time is generally given for each radio station. Thus, each radio station can succeed in the carrier sense at a certain probability and is capable of transmitting the data packet.

In the present example, a method is described for achieving the data redundancy method by broadcast or multicast described in Example 1 by performing broadcast or multicast transmission of the data packet according to the order described in the communication timing table held by each radio station.

Figure 8:
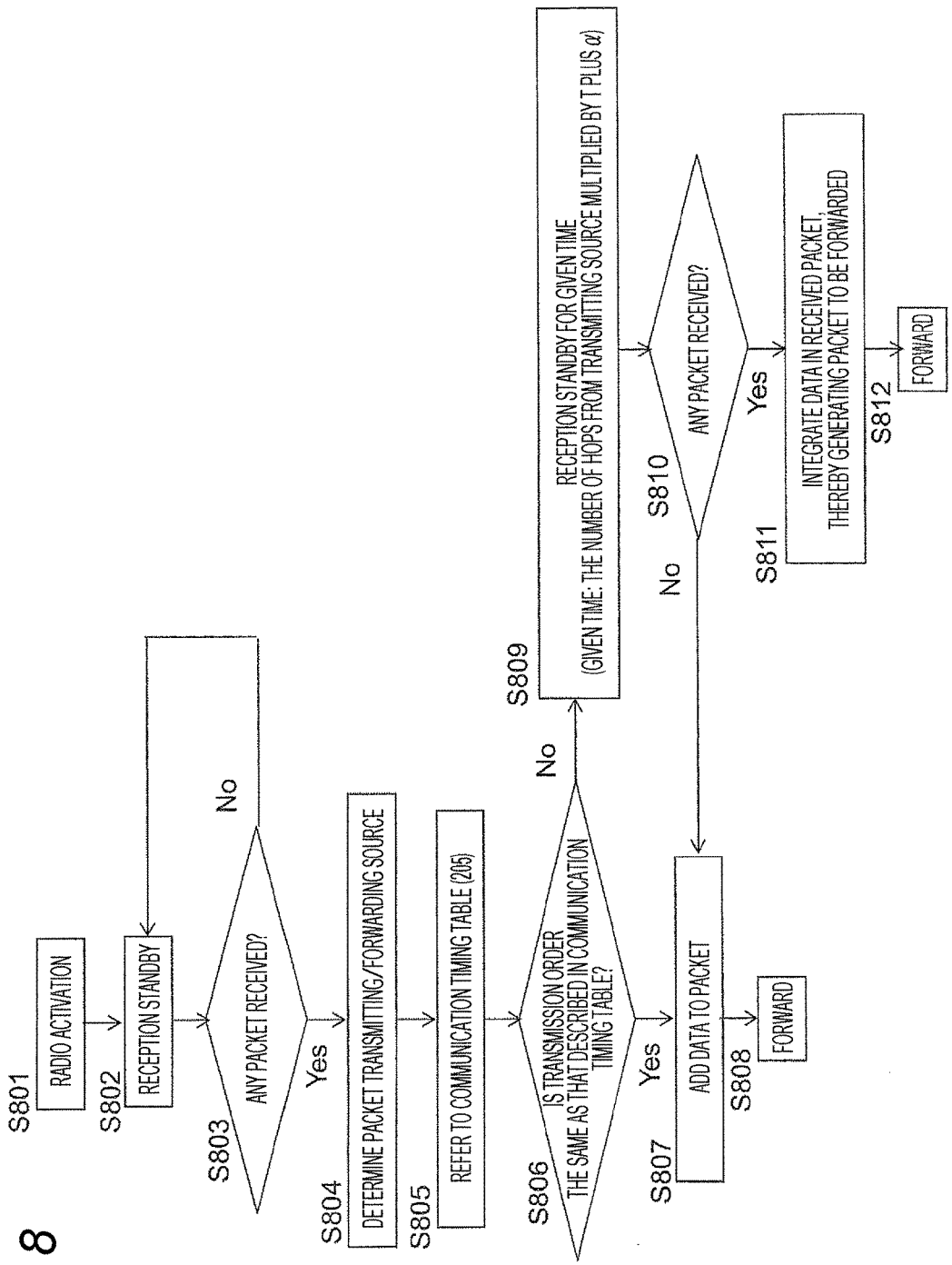
FIG. 8 is a diagram illustrating an operation sequence example of the base station 1 and the relay stations/GWs 10, 11, 12, 13 of the present invention.

FIG. 8 illustrates an operation sequence of the relay stations/GWs (10, 11, 12, 13) (and base station 1) in the present example. Here, it is assumed that a flag is inserted that can determine whether the data is an uplink communication packet or a downlink communication packet, into the data packet.

The relay stations/GWs (10, 11, 12, 13) and the base station 1, when radio activation (S801) is completed, transition to a reception standby state (S802) as far as there is no packet receiving (S803). When there is the packet receiving (S803), a transmitting source of the packet and a forwarding source of an immediately preceding hop are determined (S804), and the communication timing table (205) is referenced (S805).

Next, the communication timing table (205) is referenced, and it is determined whether or not the forwarding source of the immediately preceding hop is the radio station whose transmission order is one step before the radio station that is described in the communication timing table (S806), and, when it is the radio station whose transmission order is one step before, data of the station is added to the data packet (S807) to be forwarded via broadcast or multicast (S808).

When the order is not the one according to the communication timing table in S806, reception standby is performed for a given time (the number of hops from transmitting source multiplied by T plus α) (S809), and, when the packet is received within a reception standby time, a packet to be forwarded is generated by adding the data of the station and the data of the latest sequence number of the held data (of other radio station) to the data packet and integrating with the data in the first received packet and one or more packets received during the reception standby period (S811) to be forwarded via broadcast or multicast (S812).

On the other hand, there is no packet receiving within the reception standby time, the data packet is added to the data of the station (S807) to be forwarded via broadcast or multicast (S808). Here, in the reception standby for a given time (S809), T is an average value of time required by the radio station from receiving until forwarding of the data packet, and it is considered that variance is generated in T due to each radio station hardware specification, so that the reception standby time is adjusted by the plus α.

By the sequence of FIG. 8, the relay stations/GWs (10, 11, 12, 13) and the base station 1 are capable of executing broad/multicast transmitting/forwarding in accordance with the communication timing table (205), and, even when the data is forwarded by hopping the number of hops via broadcast or multicast (for example, when the data is forwarded to the relay station/GW three hops ahead via broadcast or multicast), the data of the hopped relay stations/GWs (relay stations/GWs one hop, and two hops ahead) can be surely collected to be included in the data, and the redundancy is increased and the communication reliability is improved.

A counter measure is described in a case in which radio connection is broken in the communication by the operation sequence of FIG. 8 described above.

Since reachability of data can be determined in the base station 1, the communication timing table 205 is rewritten from the base station 1 at time of communication break, and recovery from the communication break is attempted by distributing to each radio station the communication timing table in which the transmission order is rearranged.

Figure 9:
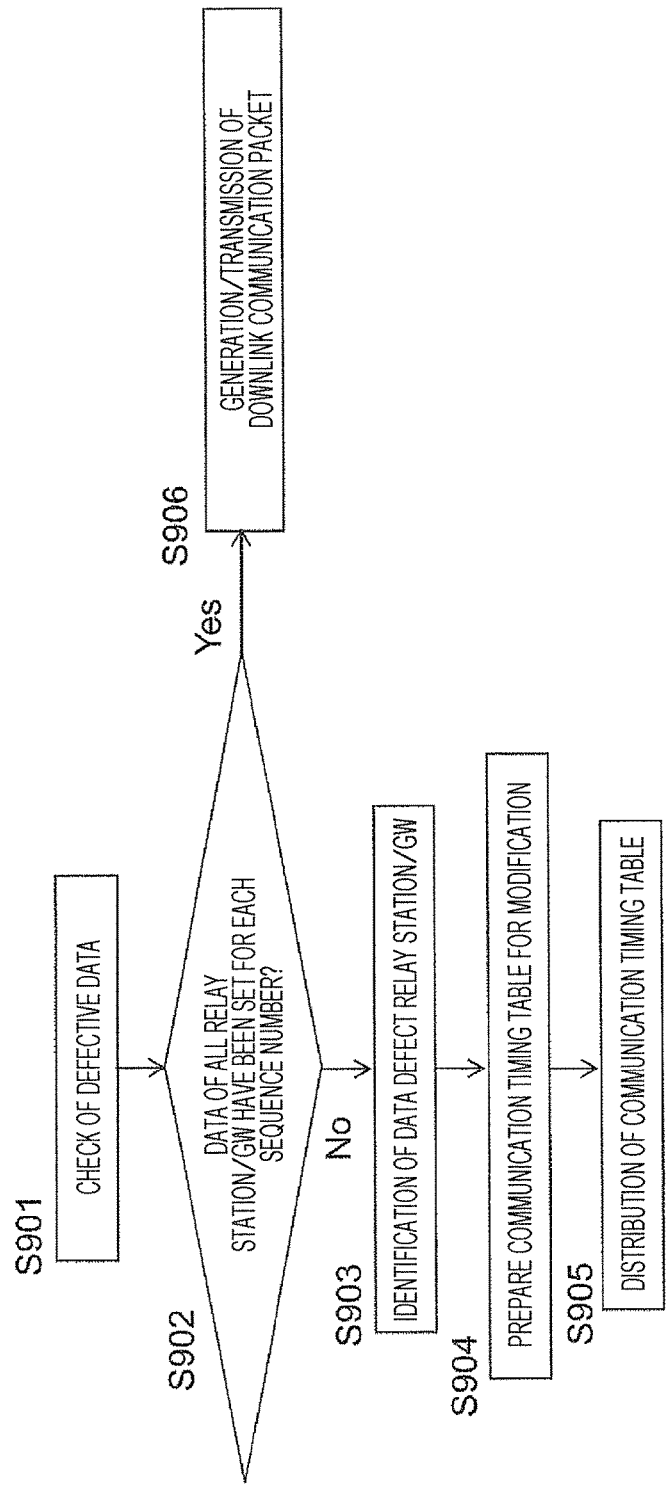
FIG. 9 is a diagram illustrating an example of an operation flow at time of modification and distribution of the communication timing table by the base station 1.

Specifically, as illustrated in FIG. 9, the base station 1 determines presence of defective data (S901), and determines whether or not the data of all relay stations/GWs are completed for each sequence number (S902). When the data are completed without any problems, there is no need to rewrite the communication timing table 205 to rearrange the transmission order, so that generation/transmission of the downlink communication packet is executed normally (S906).

When a data defect is generated, a data defect relay station/GW is identified (S903), and the communication timing table 205 for modification is prepared (S904), and the communication timing table 205 after the modification is immediately distributed to each radio station (S905).

Figure 10:
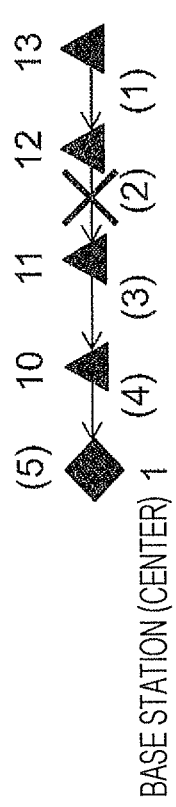
FIG. 10 is a diagram illustrating an example of a radio link in which communication is broken and a communication timing table before modification.
Figure 11:
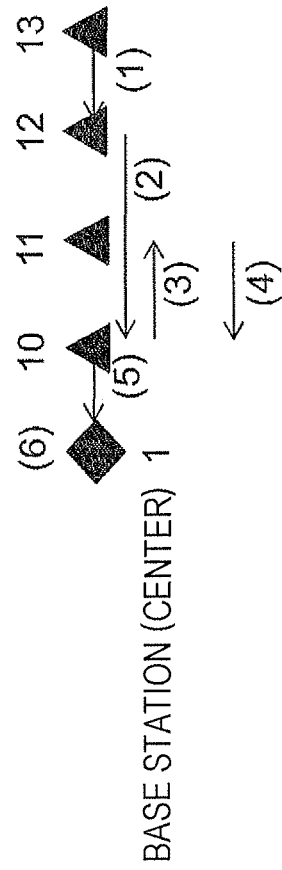
FIG. 11 is a diagram illustrating an example of a main communication path in accordance with transmission order after modification and a communication timing table after modification.
Figure 12:
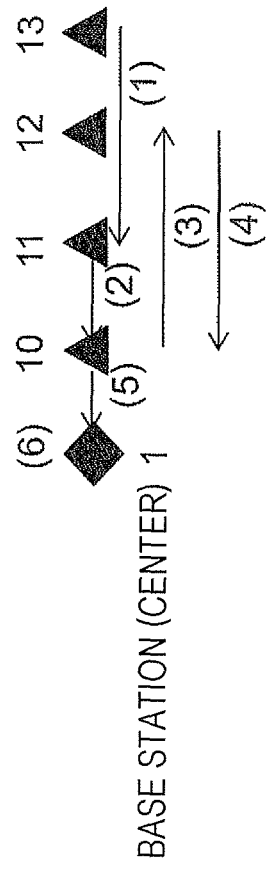
FIG. 12 is a diagram illustrating an example of a main communication path in accordance with transmission order after modification and a communication timing table after modification.

FIG. 10-FIG. 12 illustrate modification example of the communication timing table and transmission order examples of before and after the modification. In FIG. 10, the communication timing table 205 before modification is illustrated, and transmission order of (1)-(5) are assigned in turn from the radio station farther (the number of hops is greater) from the base station 1. Here, a case is considered in which communication break is generated in the radio link between the relay station/GW 12 and the relay station/GW 11.

FIG. 11 illustrates the communication timing table and the transmission order after the modification. In the example 1, transmission order (1) is assigned to the relay station/GW 13, and transmission order (2) is assigned to the relay station/GW 12, and the transmission order (3) is assigned to the relay station/GW 10, not to the relay station/GW 11. Data forwarding is performed to the relay station/GW 11 via the relay station/GW 10, and after the relay station/GW 11 performs data forwarding at transmission order (4), the relay station/GW 10 forwards the data to the base station 1 at transmission order (5) again, as a result, transmission order is assigned to avoid the radio link between the relay station/GW 12 and the relay station GW 11.

On the other hand, FIG. 12 illustrates another example (example 2) of the communication timing table after the modification. In the example 2, the relay station/GW 13 performs transmitting at transmission order (1), and then the relay station/GW 11 performs forwarding at transmission order (2). At transmission order (3), the relay station/GW 10 performs broadcast or multicast to the relay station/GW 12 as a main destination; at transmission order (4), the relay station/GW 12 performs forwarding; at transmission order (5), the relay station/GW 10 performs broadcast or multicast toward the base station again, as a result, multi-hop broadcast or multicast data forwarding is performed.

Example 3

In Example 3, as described in Example 1, one of the examples is described of the case in which it is required to limit the data redundancy. To reduce (save) the data redundancy, it is required to transmit the data to the base station 1 (or target radio station) at the number of hops as small as possible.

In the present example, a case is described of a CSMA communication method, and, in the same way as Example 2, it is assumed that a flag is inserted indicating whether the packet is an uplink communication packet or a downlink communication packet, into the data packet.

Figure 13:
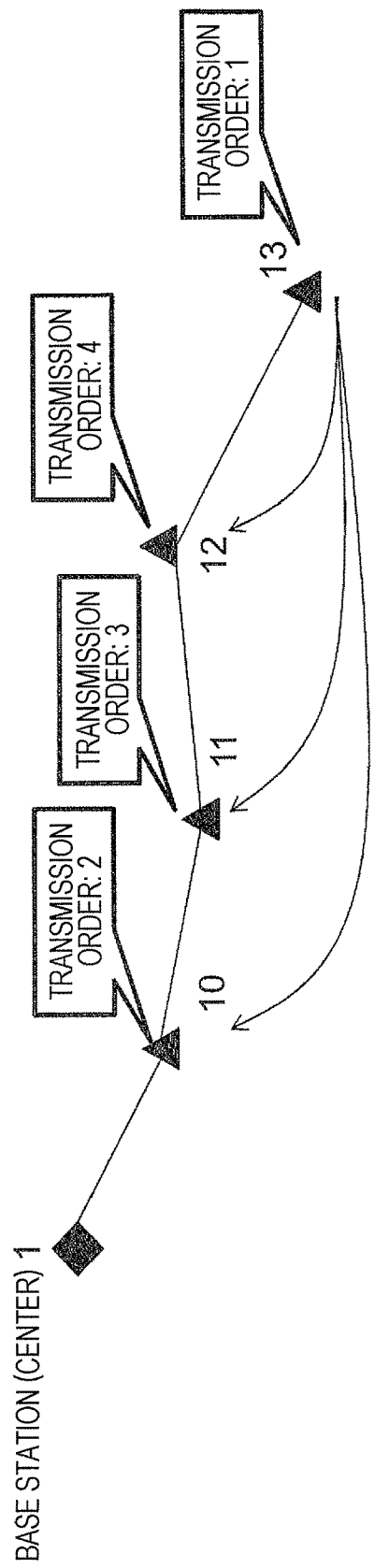
FIG. 13 is a diagram illustrating an example of transmission order.

In the present example, a transmission range is calculated for each radio station by radio wave measurement/simulation and the like in advance, and transmission order is assigned in turn preferably from the distant radio station (distant in the number of hops), as a result, the number of overlapping data is reduced. That is, when the data packet is received from a network upper stream (side in which the number of hops is less from base station 1), a packet content is determined, and the packet is structured so that radio station data having been transmitted already in an upstream radio station is not forwarded. FIG. 13 illustrates an assignment example of the transmission order. Here, an example of a linear multi-hop is illustrated; however, in a case of branched topology, transmission order assignment is performed until the data of one branch reaches the base station 1, and then assignment of transmission order of the next branch is performed. Here, radio data of the relay station/GW 13 can be transmitted to the relay station/GW 10. Assignment of the transmission order is performed as follows.

1. Transmission order 1 is assigned to a relay station/GW of a network distal end.

2. Transmission order 2 is assigned to a relay station/GW having the maximum number of hops within a range in which a radio wave reaches from the relay station/GW of the network distal end, and then the transmission order is assigned to the downstream side.

3. When assignment to the downstream side is finished (when the transmission order is assigned up to a relay station/GW of one hop upstream from that of the transmission order 1), the next transmission order is assigned to a relay station/GW of one hop upstream of that of the transmission order 2. (On this occasion, it is desirable to determine the relay station/GW of the transmission order 2 so that the radio wave from the relay station/GW of one hop upstream of that of the transmission order 1 reaches the relay station/GW of one hop upstream of that of the transmission order 2)

4. Afterwards, the above 1-3 are repeated.

When the assignment is applied to the example of FIG. 13, the transmission order becomes the one illustrated in FIG. 13.

When the data of the relay station/GW 13 reaches the relay station/GW 10, at transmission timing of the relay station/GW 10, the relay stations/GWs 11, 12 receive the data of the "relay stations/GWs 10, 13" from the relay station/GW 10. The relay stations/GWs 11, 12, when receiving the data of the downstream radio station (relay station/GW 13) from the upstream radio station (relay station/GW 10), forward the data without adding the data of the downstream radio station (relay station/GW 13) (when there is the data that overlaps with the data included in the upstream radio station (relay station/GW 10) packet, the data that does not overlap (including the data of the station) is forwarded). Besides, when the packet is not received form the relay station/GW of the preceding order even if the reception standby for a given time described in Example 2 is performed, advance transmission is performed.

Figure 14:
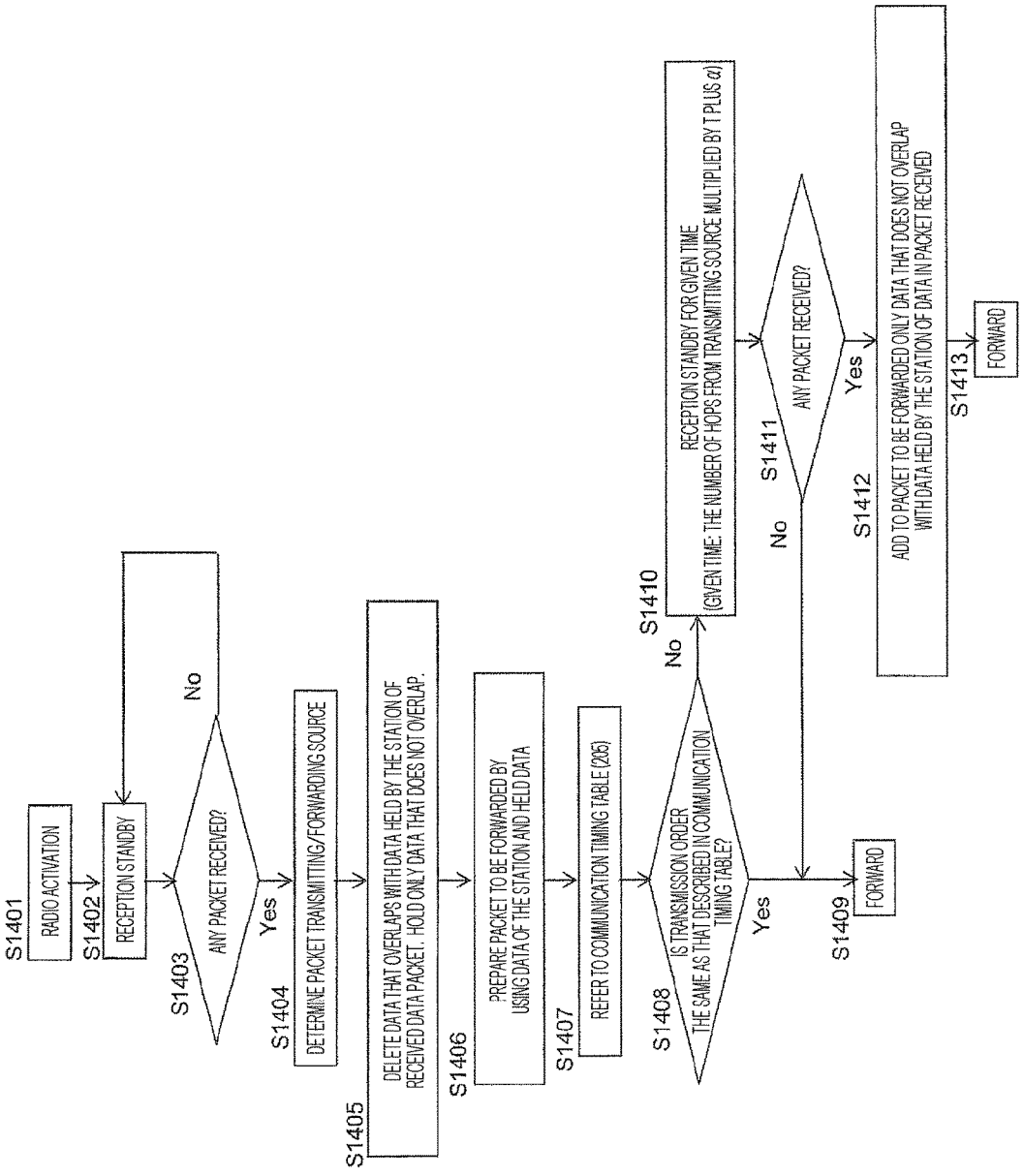
FIG. 14 is a diagram illustrating an operation sequence example of the base station 1 and the relay stations/GWs 10, 11, 12, 13 of the present invention.

In FIG. 14, an operation flowchart of each radio station is described for implementing the present example. After radio activation (S1401), the radio station immediately transitions to a reception standby state (S1402). When the data packet is not received during the reception standby (S1402), the reception standby is kept as it is (S1402); when the data packet is received (S1403), a packet transmitting source and a forwarding source described in the packet are determined (S1404).

After that, when there is data that overlaps with the data held by the station of the received data packet, the data is deleted, and only data that does not overlap is temporarily stored (S1405). Next, a packet for forwarding is prepared using the data of the station and held data (S1406), and the communication timing table (205) is referenced (S1407), and it is determined whether or not transmission order of the forwarding source of the packet is the one according to the communication timing table (S1408). When the forwarding source is the one according to the transmission order described in the communication timing table, the packet to be forwarded is forwarded as it is (S1409).

When the forwarding source is not the one according to the communication timing table, the station transitions to the reception standby state for a given time described in Example (S1410). When there is no packet receiving during the reception standby, the packet to be forwarded prepared in S1406 is forwarded as it is (S1409); however, when there is the packet receiving during the reception standby, only data that does not overlap with the data held by the station of the data in the received packet is added to the packet to be forwarded (S1412), and then forwarding is performed (S1413).

Example 4

In Example 4, as described in Example 1, one of the examples is described of the case in which it is required to limit the data redundancy.

In the present example, the radio stations are classified into a plurality of groups by the number of hops (or "closeness" of physical distance), and only data in the group can be multiplexed to one data, or data multiplexing is not allowed for data of a radio station in the group.

Thus, it becomes possible to reduce the number of data to be made redundant to one data.

Generally, when "only the data in the group can be multiplexed to one data," redundancy reduction amount is great; when "data multiplexing is not allowed for the data of the radio station in the group," it is possible to keep the communication reliability high.

Figure 15:
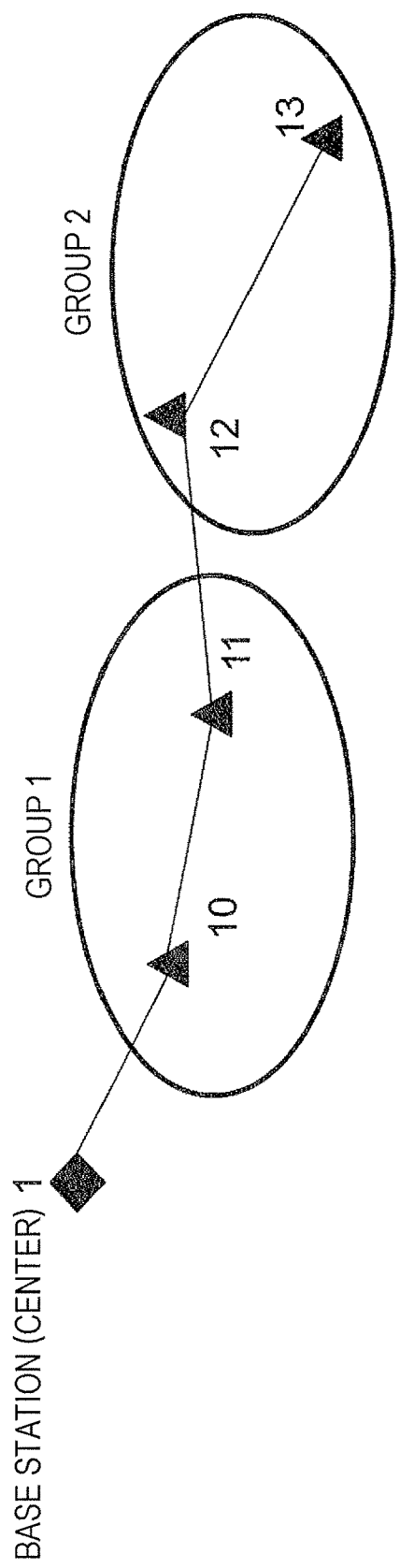
FIG. 15 is a diagram illustrating an example of grouping of relay stations/GWs.
Figure 16:
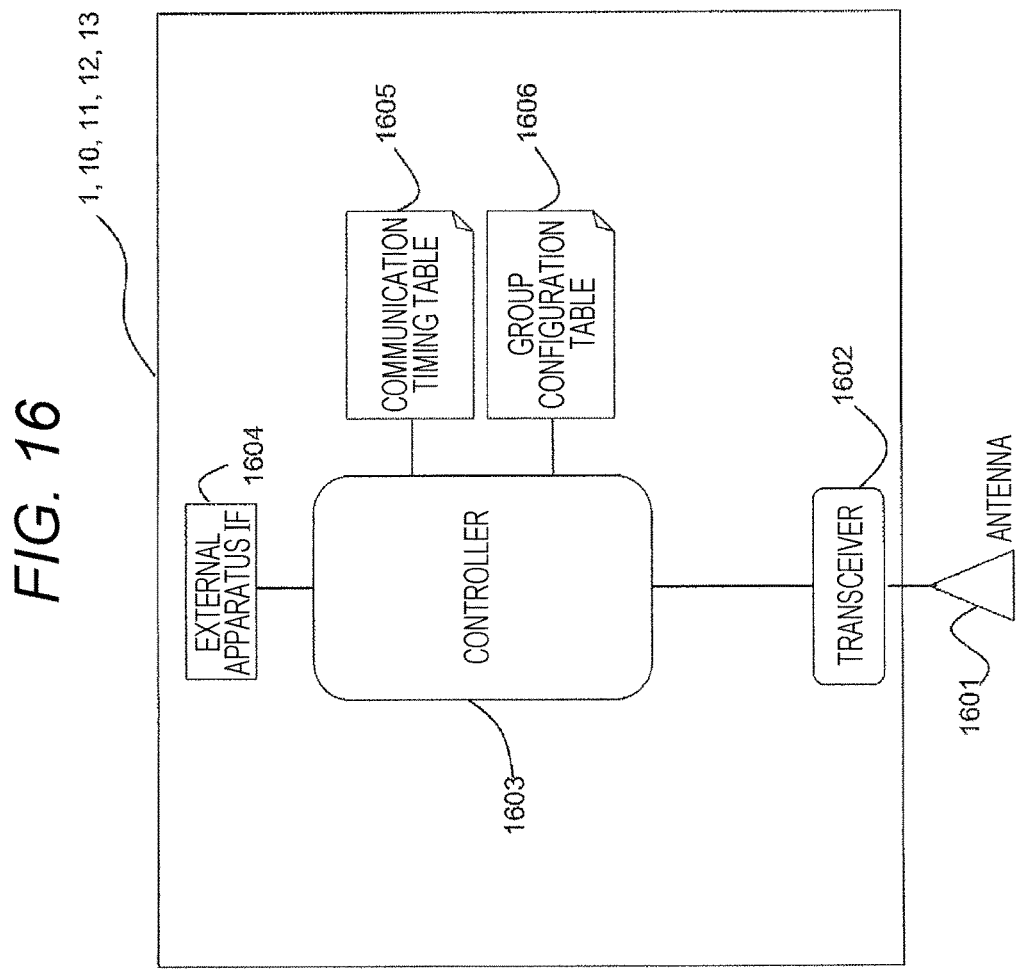
FIG. 16 is a diagram illustrating a schematic configuration example of the base station 1 and the relay stations/GWs 10, 11, 12, 13.
Figure 17:
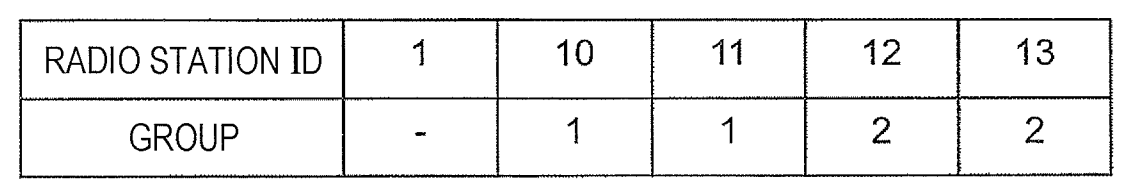

FIG. 15 illustrates a group classification example. In the example, based on the number of hops, the relay stations/GWs 10, 11 belong to a group 1, and the relay stations/GWs 12, 13 belong to a group 2. To achieve the classification, each radio station is required to grasp the group to which the station belongs. Therefore, a schematic configuration (FIG. 16) of each radio station requires a group configuration table 1606. Each radio station (base station 1, relay stations/GWs 10, 11, 12, 13) of the present example includes: an antenna 1601; a transceiver 1602; a controller 1603 for performing various types of control in the radio station; an external apparatus IF 1604; a communication timing table 1605; and the group configuration table 1606 that describes the group to which each radio station in the network belongs. The group configuration table specifies each radio station ID and a belonging group, as illustrated in FIG. 17. In the example of FIG. 17, the relay stations/GWs 10, 11 belong to the group 1, and the relay stations 12, 13 belong to the group 2.

Example 5

In Example 5, as described in Example 1, one of the examples is described of the case in which it is required to limit the data redundancy.

The present example, different from the example described above, does not assume transmission order assignment by the communication timing table, and is based on a communication method in which each radio station immediately executes the carrier sense and attempts forwarding when receiving data to be transmitted.

In the present example, the carrier sense time is set shorter as the station is closer to the base station 1 in a case of uplink communication, and as the station is farther from the base station 1 in a case of downlink communication, as a result, the data redundancy is reduced. An example of a multi-hop radio system for describing the present example and an example of the carrier sense time are illustrated in FIG. 18.

Figure 18:
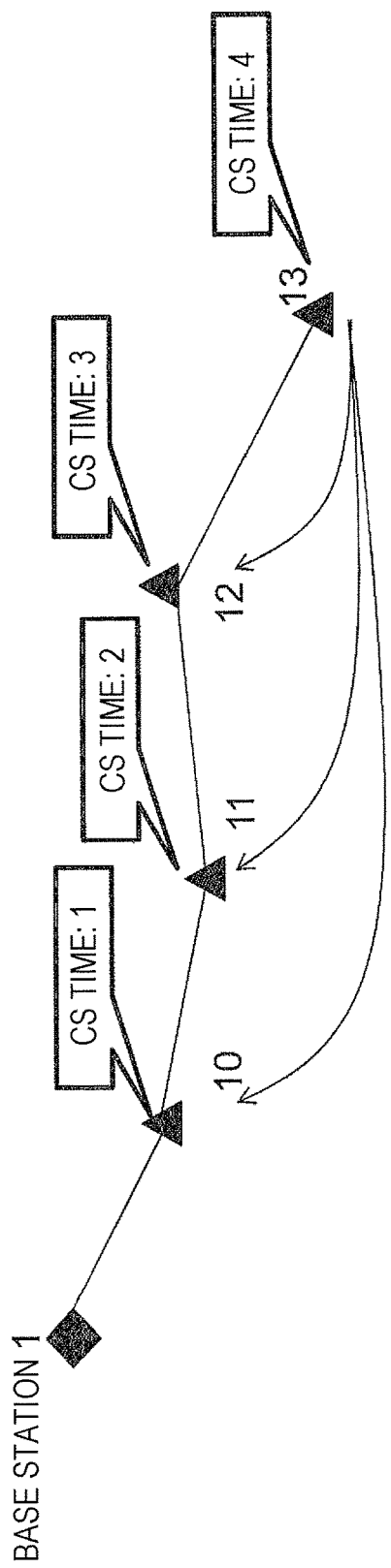
FIG. 18 is a diagram illustrating an example of carrier sense time.

In FIG. 18, the carrier sense (CS) time is set longer in turn from the radio station farther from the base station 1. A numerical value of the carrier sense time in FIG. 18 only represents magnitude of the carrier sense time by an integer, and does not represent a specific time interval (for example, 3 [ms]). When the carrier sense time is set like this, the relay stations/GWs 10, 11, 12 receive the data of the relay station/GW 13 and immediately attempt to forward the data; however, since the carrier sense time is the shortest, the relay station/GW 10 forwards first the "data of the relay stations/GWs 10 and 13" via broadcast or multicast.

The relay stations/GWs 11 and 12, when failing in the carrier sense even once during a given time after receiving the data from the relay station/GW 13, discard the data (the data of the relay station/GW 13 in the example of FIG. 18) scheduled to be added (does not add to the packet to be forwarded). Thus, the data of the relay station/GW 13 having been broadcasted or multicasted already by the relay station/GW 10 is not forwarded by the relay stations/GWs 11, 12 any longer, so that it becomes possible to reduce the redundancy of the data.

Figure 19:
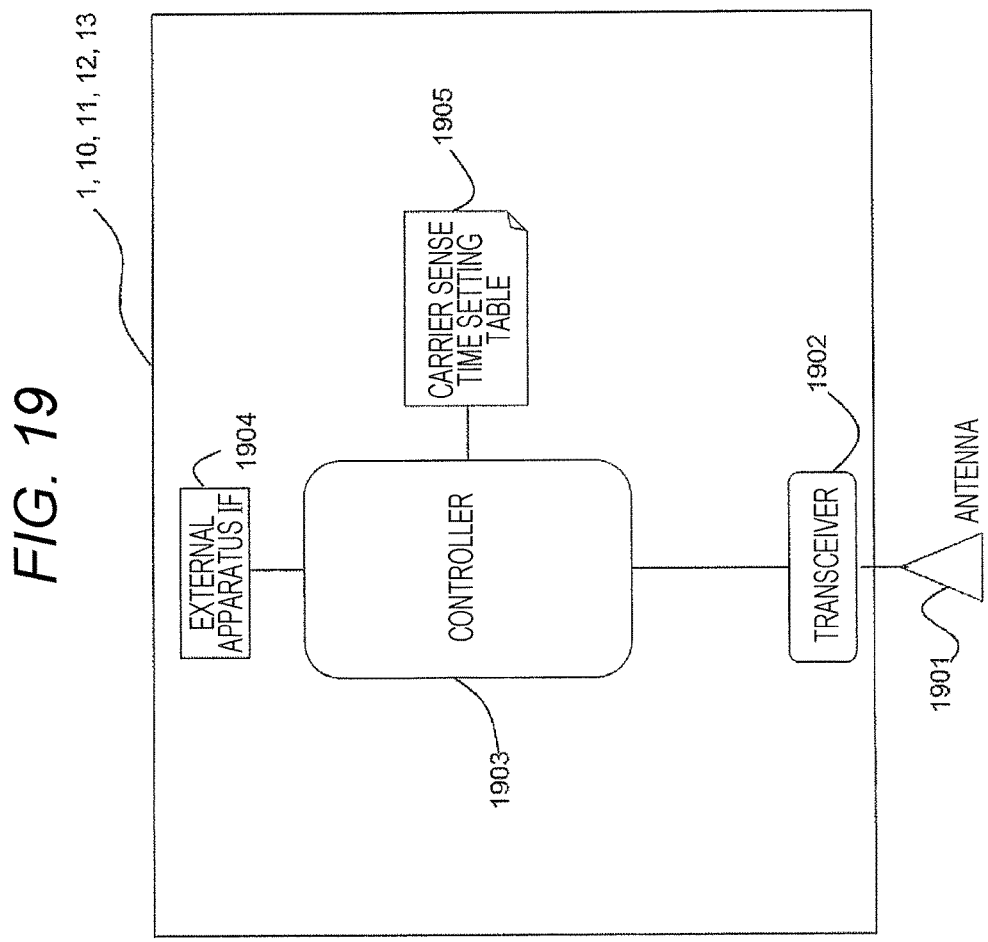
FIG. 19 is a diagram illustrating a schematic configuration example of the base station 1 and the relay stations/GWs 10, 11, 12, 13.

FIG. 19 illustrates a configuration of the base station 1, the relay stations/GWs 10, 11, 12, 13 in the present example. The base station 1, the relay stations/GWs 10, 11, 12, 13 include: an antenna 1901; a front end 1902 for performing transmission and reception; a controller 1903 responsible for execution of the carrier sense and other packet generation, transmission and reception processing and the like; an external apparatus IF 1904; and a carrier sense time setting table 1905 stored in a memory. FIG. 20 illustrates an example of the carrier sense time setting table.

In the example of FIG. 20, the carrier sense time is set for each of the uplink communication and the downlink communication, and the carrier sense time is set shorter in turn as the number of hops from the base station 1 is less in the uplink communication, and the carrier sense time is set shorter in turn as the number of hops from the base station 1 is greater in the downlink communication.

Incidentally, in the example of FIG. 20, a numerical value of the carrier sense time only represents magnitude of the carrier sense time by an integer, and does not represent a specific time interval (for example, 3 [ms]). Actually, the magnitude relationship is represented by specifying a specific time interval (for example, 3 [ms]).

Figure 21:
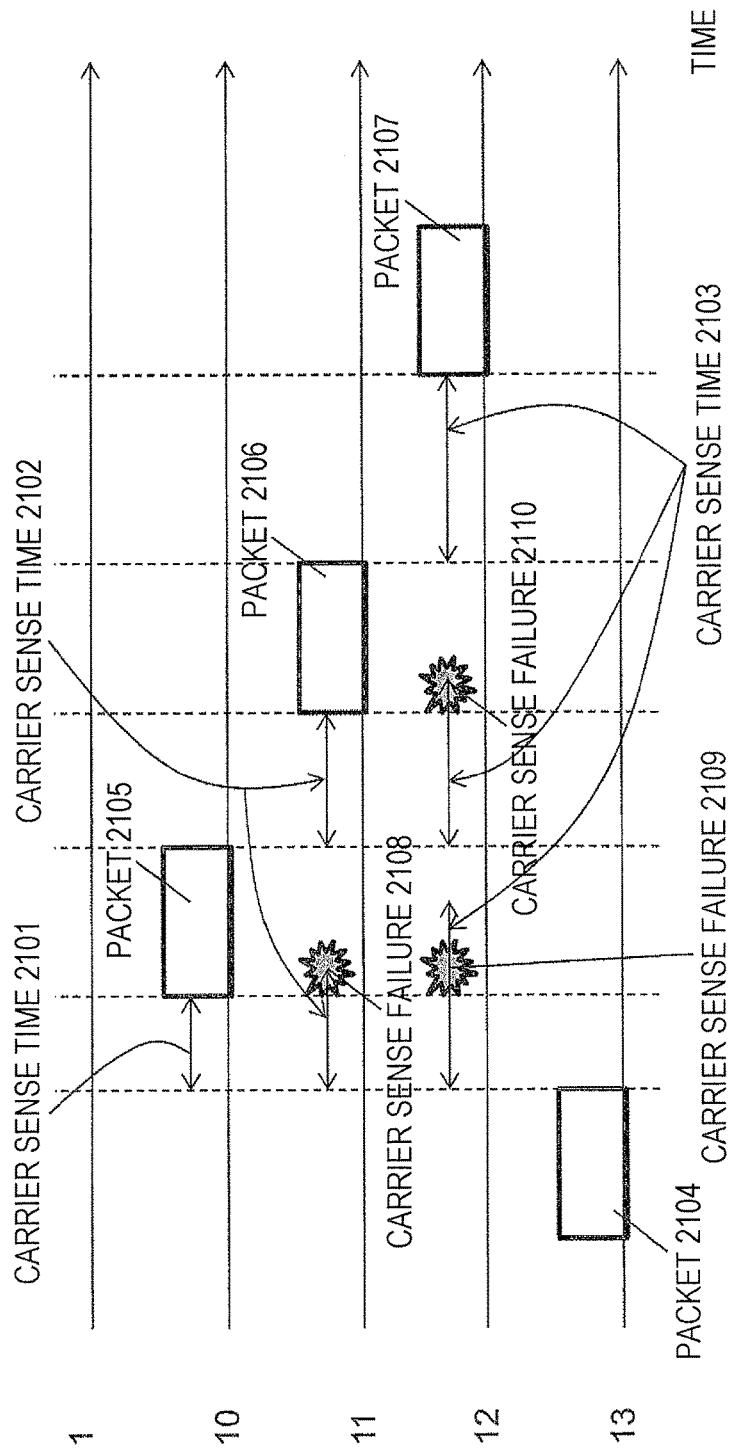
FIG. 21 is a diagram illustrating an operation example in a time series direction of the base station 1 and the relay stations/GWs 10, 11, 12, 13 of the present invention.

FIG. 21 illustrates a diagram indicating in a time direction the operation of each radio station relating to the present example, using FIG. 18 as an example.

The relay station/GW 13 first generates a packet, and transmits the data of the station via broadcast or multicast (2104). When the broadcast or multicast of the relay station/GW 13 is received in the relay stations/GWs 10, 11, 12, the relay stations/GWs 10, 11, 12 each prepare the packet by adding the data of the relay station/GW 13 to the data of the station at time of packet transmission, and prepare for the station's opportunity for transmission. The relay stations/GWs 10, 11, 12 each attempt data transmitting at about the same time; however, the carrier sense time (2101) of the relay station/GW 10 is shorter than the carrier sense times (2102 and 2103) of the relay stations/GWs 11 and 12, so that the relay station/GW 10 can execute packet transmission earlier (2105).

By the packet transmission of the relay station/GW 10 (2105), the relay stations/GWs 11 and 12 fail in the carrier sense (2108 and 2109). Here, at time of carrier sense failure, by discarding the data of the relay station/GW 13 having been added to the data before, the data of the relay station/GW 13 is not included any longer in the packet prepared for data transmitting by the relay stations/GWs 11 and 12.

Next, when the packet transmission of the relay station/GW 10 is finished (2105), the relay stations/GWs 11 and 12 execute the carrier sense again, and can transmit the packet when succeeding in the carrier sense.

After the relay station/GW 10 finishes transmission, the relay stations/GWs 11 and 12 execute the carrier sense at the same time; however, the carrier sense time is set shorter in the relay station/GW 11 (2102), so that the relay station/GW 11 first transmits the packet (2106). The packet (2106) includes only the data of the relay station/GW 11.

By the transmission packet (2106) of the relay station/GW 11, the relay station/GW 12 fails in the carrier sense again (2110), and after transmission of the packet is finished (2106), the carrier sense is executed again (2103), and then the packet (2107) can be transmitted. The packet (2107) includes only the data of the relay station/GW 12.

Figure 22:
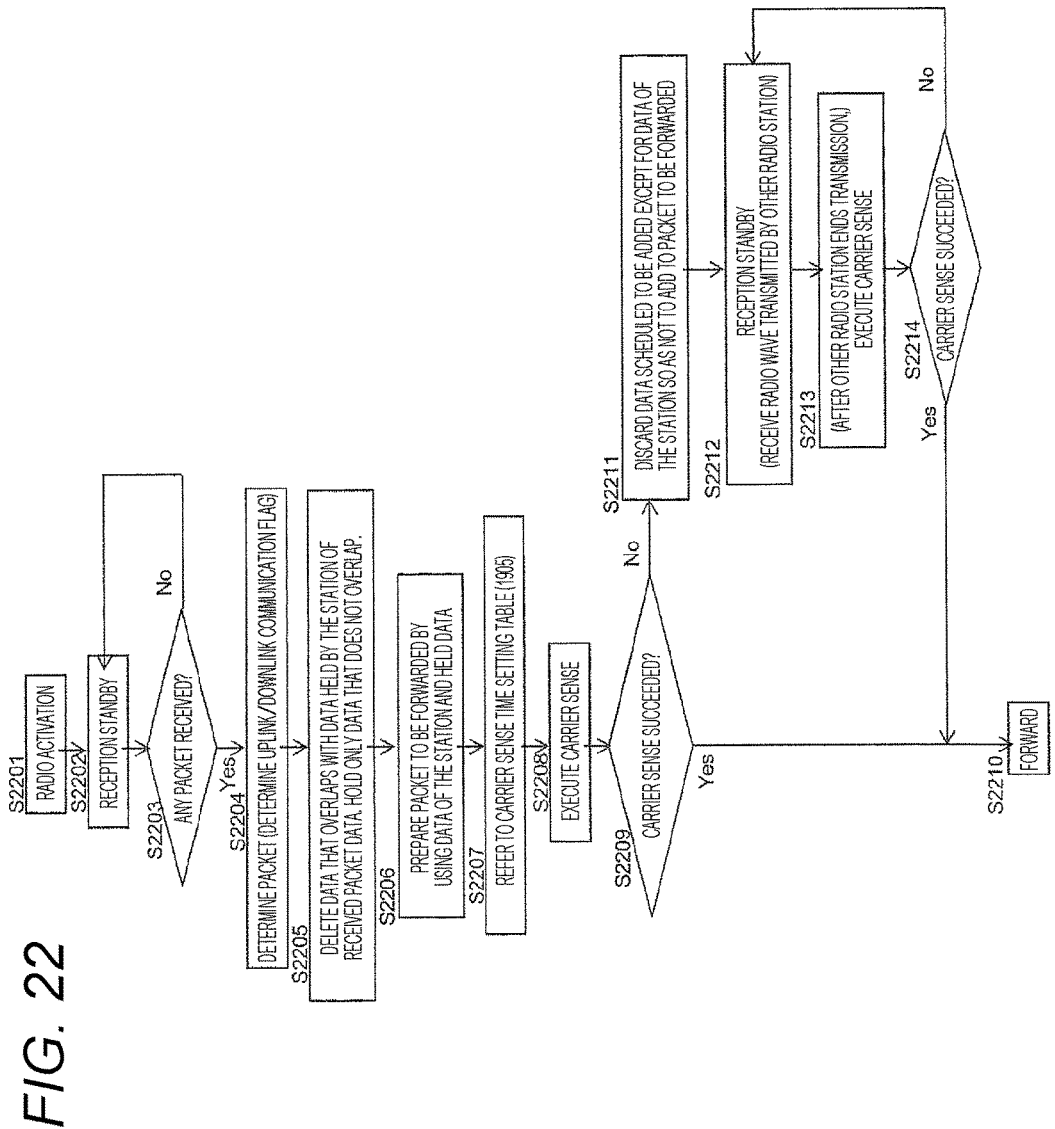
FIG. 22 is a diagram illustrating an operation sequence example of the base station 1 and the relay stations/GWs 10, 11, 12, 13 of the present invention.

FIG. 22 illustrates an operation flowchart of each radio station. Each radio station, after radio activation (S2201), immediately transitions to a reception standby (S2202) state. When the packet is not received during the reception standby (S2202), the reception standby (S2202) is continued; when the packet is received, packet determination is performed (S2203, S2204). In the packet determination, first, it is determined whether the packet is an uplink communication packet or a downlink communication packet, based on a special bit (flag) added in the packet (S2204).

After that, data that overlaps with the data held by the station is deleted of the data in the received packet, and only data that does not overlap is stored (S2205). Next, the packet to be forwarded is generated using the data of the station and the held data (S2206).

Thus, transmission preparation is completed, and the carrier sense time setting table (1905) is referenced (S2207), and the carrier sense is executed for a time specified by the table (S2208). When the carrier sense succeeds (S2209), the packet to be forwarded prepared is forwarded as it is via broadcast or multicast (S2210).

On the other hand, when the carrier sense fails (S2209), the added data other than the data of the station is discarded from the packet to be forwarded (S2211). Then, the reception standby state is kept until the other radio station finishes the packet transmission (S2212), and after the other radio station finishes the packet transmission, the carrier sense is executed (S2213), and then, when the carrier sense succeeds, the packet including only the data of the station is forwarded (S2210); when the carrier sense fails, the reception standby state is kept until the other radio station finishes the packet transmission again (S2212), and the same operation is repeated.

Besides, when there is data addition limitation number, a method is also one of examples of the present invention in which: for a packet that reaches the limitation number, the data is not added, and the packet is forwarded; and only when a packet that does not reach the limitation number has been forwarded to the station, the data of the station is added to the packet, and the packet is forwarded via broadcast or multicast.

(Others)

The present invention can also be achieved by a program code of software for achieving a function of the embodiments. In that case, a storage medium recording the program code is provided to a system or an apparatus, and a computer (or CPU or MPU) of the system or the apparatus reads the program code stored in the storage medium.

In that case, the program code itself read from the storage medium achieves the function of the embodiments described above, and the program code itself and the storage medium storing the program code configure the present invention. As the storage medium for providing such a program code, for example, a flexible disk, CD-ROM, DVD-ROM, hard disk, optical disk, magneto optical disk, CD-R, magnetic tape, nonvolatile memory card, and ROM are used.

Besides, based on an instruction of the program code, an OS (operating system) and the like operating on the computer perform part or all of actual processing, and the function of the embodiments described above can be achieved by the processing. Further, after the program code read from the storage medium is written in a memory on the computer, based on the instruction of the program code, the CPU of the computer and the like perform part or all of the actual processing, and the function of the embodiments described above can be achieved by the processing.

Further, the program code of the software for achieving the function of the embodiments is stored in storage means such as the hard disk and memory of the system or apparatus or in the storage medium such as the CD-R, CD-RW, by being distributed via a network, and, at time of use, the computer (or CPU or MPU) of the system or apparatus can read and execute the program code stored in the storage means or the storage medium.

Finally, it should be understood that the process and techniques described herein are essentially not associated with any particular apparatus, and can be implemented by any suitable combination of components. Further, various types of general purpose devices can be used in accordance with the teaching described herein. It may be seen that it is beneficial to construct a dedicated apparatus to execute the steps of the method described herein. Besides, various inventions can be formed by properly combining the constituents disclosed in the embodiments.

For example, some of the constituents can be deleted from all the constituents shown in the embodiments. Further, constituents over different embodiments can be properly combined. The present invention has been described in association with specific examples; however, those are not for limitation but for the description in all aspects. To those skilled in the art, it will be understood that there are many combinations of hardware, software, and firmware suitable for implementing the present invention. For example, the software described can be implemented in a wide range of program or scripting language, such as assembler, C/C++, perl, Shell, PHP, and Java (registered trademark).

Further, in the embodiments described above, control lines and information lines indicated are considered to be necessary on the description, and do not necessarily indicate all the control lines and information lines on products. All configurations can be connected to each other.

In addition, to those having ordinary skill in the art, other implementations of the present invention becomes apparent from consideration of the specification and embodiments of the present invention disclosed herein. Various aspects and/or components of the embodiments described can be used alone or in any combination, in a computerized storage system having a function for managing data.

REFERENCE SIGNS LIST

1 . . . base station
10, 11, 12, 13 . . . relay station/GW
101, 111, 121, 131 . . . sub-network
201, 1601, 1901 . . . antenna
202, 1602, 1902 . . . transceiver
203, 1603, 1903 . . . controller
205, 1605 . . . communication timing table
1606 . . . group configuration table
1905 . . . carrier sense time setting table
204, 1604, 1904 . . . external apparatus interface (IF)
410d, 411d, 412d, 413d . . . data packet
710d, 711d, 712d, 713d . . . data packet
401c, 410c, 411c, 412c . . . control packet
701c, 710c, 711c, 712c . . . control packet
2101, 2102, 2103 . . . carrier sense time
2104, 2105, 2106, 2107 . . . packet
2108, 2109, 2110 . . . carrier sense failure

The invention claimed is:

1. A multi-hop radio communication method for a plurality of radio stations, wherein the radio stations comprise one or more radio base stations, one or more radio relay stations each including a terminal function, and one or more radio terminal stations, wherein the plurality of radio stations are in a mutually communicable range, wherein the radio stations are configured to operate asynchronously with respect to each other, each of the radio stations having a communication timing table in which transmission order is described in a memory mounted in each of the radio stations, the method comprising:

storing data indicating either of predetermined data transmission timing or transmission order defined by the communication timing table in the memory included in each of the radio stations individually;

when communication data to be transmitted to other one or more of the radio stations are generated in any one of the radio stations, transmitting, by a first radio station of the radio stations, communication data toward the other one or more of the radio stations via broadcast or multicast, in accordance with the data transmission timing or the transmission order;

transmitting, by a second radio station of the radio stations which is different from the first radio station and which has received the communication data from the first radio station toward another radio station of the plurality of radio stations other than the first and second radio stations, data to be transmitted which is prepared by adding transmission data held by the second radio station and data of the second radio station collected by the second radio station to the communication data received;

receiving, by a third radio station other than the first and second radio stations, the communication data and the data to be transmitted from the second radio station; and determining, by any one radio station of the plurality of radio stations, whether to perform data forwarding or not, based on a specific bit data as a flag included in a broadcast or multicast packet received from another radio station and indicating whether it is "a destination of packet transmission is a base station direction" indicating that it is uplink communication or "a direction of packet transmission is a direction from a base station to a distal relay station or a terminal" indicating that it is downlink communication, wherein the one radio station adds transmission data of the one radio station to data to be transmitted and then forwards the data to be transmitted via broadcast or multicast when receiving the packet from another radio station whose transmission order described in the communication timing table is one step before the transmission order of the one radio station, and transitions to a reception standby state when receiving the packet from another radio station whose transmission order described in the communication timing table is anything other than one step before the transmission order of the one radio station.

2. The multi-hop radio communication method according to claim 1, wherein
the plurality of radio stations comprise at least one radio base station, a plurality of radio relay stations, and a plurality of radio terminal stations,
the at least one radio base station distributes time information by a radio packet for time synchronization to each of the radio terminal stations and each of the radio relay stations, in a super frame including a plurality of time slots,
each of the radio terminal stations and each of the radio relay stations receive the radio packet for time synchronization from the radio base station via a multi-hop radio communication system,
each of the radio terminal stations and each of the radio relay stations execute time synchronization with base station time by determining base station time information in the radio packet for time synchronization data, and
data transmitting or data forwarding is performed via broadcast or multicast, in a time slot assigned as a transmission opportunity to each of the radio terminal stations, each of the radio relay stations, and each of the at least one radio base station, in the super frame.

3. The multi-hop radio communication method according to claim 1, wherein,
the plurality of radio stations comprise at least one radio base station, a plurality of radio relay stations, and a plurality of radio terminal stations; and in a case of receiving a broadcast or multicast packet by the one radio station from another radio station whose transmission order described in the communication timing table is two or more steps before, when not receiving the broadcast or multicast packet from another radio station whose transmission order is one step before even when a predetermined reception standby time elapses in the reception standby state, the one radio station forwards the data to be transmitted by adding data that does not overlap with the data to be transmitted of the transmission data of the one radio station and the data received by the one radio station within the predetermined reception standby time, without waiting to receive a packet from the radio station whose transmission order is one step before the transmission order of the one radio station.

4. The multi-hop radio communication method according to claim 3, wherein, during operation of a radio communication system including the at least one radio base station, the plurality of radio relay stations, and a plurality of radio terminal stations, the at least one radio base station:
monitors a data arrival rate from each of the radio terminal stations and each of the radio relay stations, and
improves the data arrival rate from any radio terminal station and any radio relay station whose data do not arrive at the at least one radio base station by identifying a radio link whose data arrival rate is equal to or less than a predetermined value and modifying transmission order not to include the radio link as a main communication path, and
becomes a main body and modifies the communication timing table of the at least one radio base station to modify the transmission order, and further, modifies transmission order of each of the radio terminal stations and the radio relay stations by distributing a communication timing table modification instruction packet in each of the plurality of radio stations to each of the radio terminal stations and the radio relay stations.

5. The multi-hop radio communication method according to claim 3, wherein
assignment of data transmission order is described in the communication timing table included in each of the radio terminal stations, the radio relay stations, and the at least one radio base station, indicating when data forwarding is possible from a radio terminal station, a radio relay station, or a radio base station, and
in a case of uplink communication, data transmission order is assigned sequentially to a downstream direction, in turn, from the radio station being the farthest in a communication path direction or having a greatest number of multi-hops toward the radio station having a less number of the multi-hops, and
in a case of downlink communication, data transmission order is assigned sequentially to an upstream direction, in turn, from the radio station being the farthest in the communication path direction or having the greatest number of multi-hops toward the radio station having a less number of the multi-hops.

6. The multi-hop radio communication method according to claim 5, wherein,
in a case of the uplink communication, when a broadcast or multicast packet is received from a radio station being closer in distance from the at least one radio base station than the one radio station or having a less number of hops, or
in a case of the downlink communication, when a broadcast or multicast packet is received from a radio station being farther in distance from the at least one radio base station than the one radio station or having a greater number of hops, when the station holds data that overlaps with data in a received packet,
the overlapping data is not forwarded from the one radio station to another radio station.

7. The multi-hop radio communication method according to claim 3, comprising processing in which, of each of the radio terminal stations, each of the radio relay stations and each of the radio base stations amongst the plurality of radio stations in a multi-hop radio communication system, at least two of the radio stations are selected to be grouped in advance, or specific radio stations or radio stations being within a predetermined number of hops are grouped, and only data of the radio stations in the group of the one radio station is added to a packet having been forwarded to the one radio station, and the data after the addition is permitted to be transmitted or forwarded from the one radio station via broadcast or multicast.

8. The multi-hop radio communication method according to claim 3, comprising processing in which, in each of radio terminal stations, relay radio stations and radio base stations amongst the plurality of radio stations in a multi-hop radio communication system, at least two of the radio stations are selected to be grouped in advance, or specific radio stations or radio stations being within a given number of hops are grouped, and only data of the radio stations outside the group of the one radio station are added to a packet having been forwarded to the one radio station, and the data after the addition is permitted to be transmitted or forwarded from the one radio station via broadcast or multicast.

9. The multi-hop radio communication method according to claim 1, wherein
each of the stations, when receiving a radio packet, adds data to be transmitted held by the radio station to the packet and forwards the data after executing carrier sense, and, in uplink communication, sets carrier sense time shorter for the radio terminal stations and the radio relay stations being relatively closer in straight-line distance from a radio base station or having a relatively smaller number of hops from the radio base station, and, in downlink communication, sets the carrier sense time shorter for the radio terminal stations and the radio relay stations being relatively farther in straight-line distance from the radio base station or having a relatively greater number of hops from the radio base station, and
each of the radio stations, when failing in the carrier sense, without adding data of the radio station to a packet having been transmitted to the radio station, transmits or forwards the packet having been transmitted as is.

10. The multi-hop radio communication method according to claim 1, wherein
the one radio station transmits or forwards the data having received in a packet as is without adding the data of the one radio station when a data amount to be added to the packet exceeds a predetermined value.

* * * * *